United States Patent
Alameh et al.

(10) Patent No.: US 7,302,127 B1
(45) Date of Patent: Nov. 27, 2007

(54) STRIP TO POINT OPTICAL COMMUNICATION SYSTEM

(75) Inventors: Rachid M. Alameh, Crystal Lake, IL (US); Mark A. Barabolak, Elmhurst, IL (US); Maninder S. Sehmbey, Hoffman Estates, IL (US); David R. Zeiger, Mundelein, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/538,338

(22) Filed: Oct. 3, 2006

(51) Int. Cl.
G02B 6/36 (2006.01)
G02B 6/12 (2006.01)
G02B 6/26 (2006.01)

(52) U.S. Cl. .............................. 385/14; 385/27; 385/36; 385/39; 385/50; 385/88; 385/92; 385/93; 379/433.12; 455/556.1; 455/575.1

(58) Field of Classification Search ................ 385/14, 385/27, 36, 39, 43, 50, 88–92, 147; 379/433.12; 455/90.3, 550.01, 556.1, 575.1
See application file for complete search history.

(56) References Cited

U.S. PATENT DOCUMENTS

| | | |
|---|---|---|
| 5,101,460 A | 3/1992 | Richard |
| 5,245,622 A | 9/1993 | Jewell et al. |
| 5,355,242 A | 10/1994 | Eastmond et al. |
| 5,371,623 A | 12/1994 | Eastmond et al. |
| 5,638,469 A | 6/1997 | Feldman et al. |
| 5,832,147 A | 11/1998 | Yeh et al. |
| 6,075,804 A | 6/2000 | Deppe et al. |
| 6,765,943 B2 | 7/2004 | Jewell |
| 2003/0064688 A1* | 4/2003 | Mizuta et al. ................. 455/90 |
| 2003/0125008 A1* | 7/2003 | Shimamura ................. 455/344 |
| 2004/0266477 A1* | 12/2004 | Murata ..................... 455/556.1 |
| 2007/0065090 A1* | 3/2007 | Lin ............................. 385/147 |

OTHER PUBLICATIONS

Picolight; "Product Selection Guide"; www.picolight.com/userfiles/pdf/part_number_selector_components.pdf; 1 page, no data available.

* cited by examiner

*Primary Examiner*—Frank G. Font
*Assistant Examiner*—Michael P. Mooney
(74) *Attorney, Agent, or Firm*—Lawrence J. Chapa

(57) ABSTRACT

A strip to point optical communication system (200) for transmitting light between a first housing (102) and a second housing (104) of a device is provided. The strip to point optical communication system (200) includes a point optical communication element (202) that is capable of receiving the light. The point optical communication element (202) is coupled to either the first housing (102) or the second housing (104). The strip to point optical communication system (200) also includes a strip optical communication element (204) that is coupled to either the first housing (102) or the second housing (104) to which the point optical communication element (202) is not coupled. The length of the strip optical communication element (204) corresponds to the travel distance of the first housing (102) and the second housing (104). The strip optical communication element (204) is located to coincide with a travel path of the point optical communication element (202).

20 Claims, 5 Drawing Sheets

STRIP TO POINT OPTICAL COMMUNICATION SYSTEM

FIELD OF THE INVENTION

The present invention relates generally to a communication system between multiple housings of a device, where the multiple housings are adapted to move relative to one another, and more specifically, to a strip to a point optical communication system.

BACKGROUND OF THE INVENTION

The present decade has witnessed the increased usage and greater complexity of active elements in a communication device, which need to be physically linked and/or communicatively coupled to other elements in the communication device. Examples of such a communication device include, but are not limited to, a radio telephone, a pager, a laptop, and a Personal Digital Assistant (PDA). Examples of the active elements include, but are not limited to, a camera, a display, and a fingerprint sensor. In at least one common configuration, the communication device can include a first housing and a second housing, where a greater number of the active elements are increasingly being placed in alternative ones of the first housing and the second housing. This has tended to result in an increasing amount of data being conveyed between the first housing and the second housing to transmit data such as video content and audio content between them. The increasing amount of data can be accommodated by an increasing number of data lines and/or an increase in the data rate for at least some of the data lines.

In one of the known methods of conveying data between a first housing and a second housing, the data is routed via a complex multi-layer flex circuit. The multi-layer flex circuit generally includes a multiple layer of high density conductive traces interleaved with an insulating material. The multi-layer flex circuit is then passed through a restricted space between the first housing and the second housing. However, routing a large number of signals through the restricted space can result in the multi-layer flex circuit that is mechanically less reliable and has greater radio-frequency interference. Furthermore, there are limits as to how restricted the space can be and still allow the multi-layer flex circuit to be appropriately routed, and allow the same to bend, as necessary. In the same or related known methods for transmitting the data, a shield layer can be provided to the multi-layer flex circuit in areas to minimize the radio-frequency interference, caused by the multi-layer flex circuit. However, this often results in an increased stiffness, complexity and cost of the multi-layer flex circuit. In some areas where the multi-layer flex circuit is bent or twisted, the layers will be separated from each other so as to enhance the ability of the multi-layer flex circuit to mechanically flex. However the accommodation of an ability of the layers to separate, and the corresponding separation of the same, can often result in a reduction in the efficiency of the shielding.

Alternatively, any attempt to reduce the number of signals being conveyed by the multi-layer flex circuit to simplify the structure of the same, often requires that the data rates of the signals on at least some of the remaining data lines to be increased, which can result in even greater amounts of the radio-frequency interference.

In light of the above mentioned discussion there is a need for a system for the data transmission between the first housing and the second housing which limits the amount of any radio-frequency interference. Further, the system should accommodate relatively high-speed data transmission between the first housing and the second housing. Furthermore, the system should be cost-effective and easy to assemble.

SUMMARY OF THE INVENTION

The present invention provides a strip to point optical communication system for data transmission between a first housing and a second housing of a device. Generally, a signal in the form of light (i.e. an electromagnetic radiation) is used in the strip to point optical communication system for the data transmission between the first housing and the second housing of the device. In at least one embodiment of the present invention, the strip to point optical communication system for transmitting light between the first housing and the second housing of the device is provided. The first housing and the second housing can move relative to one another a distance corresponding to a travel distance between a plurality of different usage positions. The strip to point optical communication system includes a point optical communication element. The point optical communication element is capable of receiving the light and can be coupled to either the first housing or the second housing. The strip to point optical communication system also includes a strip optical communication element, which is capable of emitting the light. The strip optical communication element can be coupled to the other one of the first housing and the second housing to which the point optical communication is not coupled. The length of the strip optical communication element can correspond to the travel distance of the first housing and the second housing. The strip optical communication element can be located to coincide with a travel path of the point optical communication element.

In a further embodiment of the present invention, a device is provided, which comprises a two part housing including a first housing and a second housing that are adapted to move relative to one another. The device also includes a strip to point optical communication system for transmitting the light between the first housing and the second housing. Further, the strip to point optical communication system includes a point optical communication element that is capable of receiving the light. The point optical communication element can be coupled to either the first housing or the second housing. The strip to point optical communication system also includes a strip optical communication element that is capable of emitting the light. The strip optical communication element can be coupled to other one of the first housing and the second housing to which the point optical communication element is not coupled. The length of the strip optical communication element can correspond to a travel distance of the first housing and the second housing. The strip optical communication element can be located to coincide with a travel path of the point optical communication element.

These and other features, as well as the advantages of this invention, are evident from the following description of one or more embodiments of this invention, with reference to the accompanying figures.

BRIEF DESCRIPTION OF FIGURES

The present invention is illustrated by way of example and not limitation in the accompanying figures, in which like references indicate similar elements, and in which.

Figure 1:
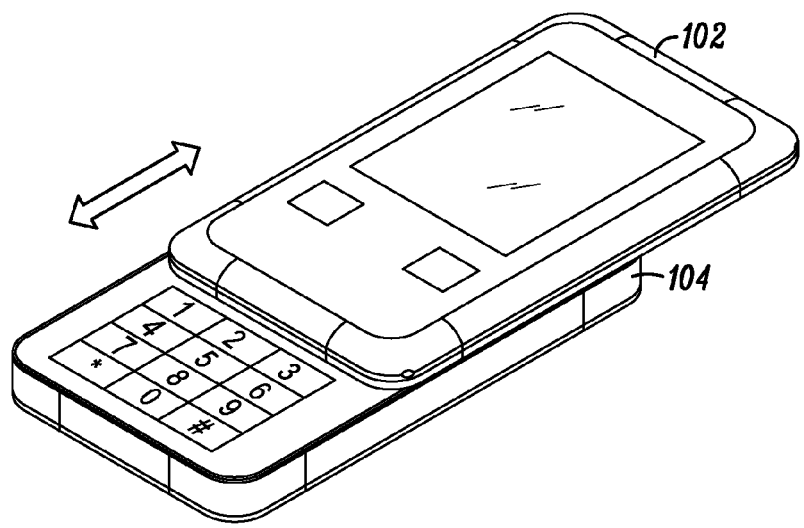
FIG. 1 illustrates a device having a two part housing which is adapted to move relative to one another, where various embodiments of the present invention can be applicable.

Skilled artisans will appreciate that elements in the figures are illustrated for simplicity and clarity and have not necessarily been drawn to scale. For example, the dimensions of some of the elements in the figures may be exaggerated relative to other elements to help in improving an understanding of embodiments of the present invention.

DETAILED DESCRIPTION

Before describing in detail the particular system for optical communication in accordance with the present invention, it should be observed that the present invention resides primarily as apparatus components related to the strip to point optical communication system. Accordingly, the apparatus components have been represented where appropriate by conventional symbols in the drawings, showing only those specific details that are pertinent for an understanding of the present invention so as not to obscure the disclosure with details that will be readily apparent to those of ordinary skill in the art, having the benefit of the description herein.

In this document, relational terms such as 'first' and 'second', and the like may be used solely to distinguish one entity from another entity without necessarily requiring or implying any actual such relationship or order between such entities. The terms 'comprises', 'comprising', 'includes', 'including' or any other variation thereof, are intended to cover a non-exclusive inclusion, such that a process, method, article, or apparatus that comprises a list of elements does not include only those elements but may include other elements not expressly listed or inherent to such article, or apparatus. An element preceded by 'comprises . . . a' does not, without more constraints, preclude the existence of additional identical elements in the article, or apparatus that comprises the element. The term 'another', as used herein, is defined as at least a second or more. The term 'including' as used herein, is defined as comprising.

FIG. 1 illustrates a device 100, where various embodiments of the present invention can be applicable. Examples of the device 100 include, but are not limited to, a wireless communication device, a radio telephone, a pager, a laptop, a music playback device (i.e. MP3 Player), and a personal digital assistant (PDA). The device 100 includes a first housing 102 and a second housing 104. The first housing 102 and the second housing 104 can move relative to one another a distance corresponding to a travel distance of either the first housing 102 or the second housing 104, between a plurality of different usage positions. The travel distance is the relative distance traversed either by the first housing 102 or the second housing 104 with respect to the other while moving. In at least one embodiment of the present invention, the plurality of the different usage positions can include, but are not limited to, a closed position and an open position of the first housing 102 and the second housing 104. The doubly pointed arrow in FIG. 1 illustrates the potential movement of the first housing 102 and the second housing 104 relative to one another, which can result in a closed position, an open position, and any number of positions therebetween. In the particular embodiment illustrated, the first housing 102 and the second housing 104 can travel along a pair of substantially parallel paths relative to one another. This is sometimes referred to as a slider configuration.

In a further embodiment of the present invention, either the first housing 102 or the second housing 104 can include one or more active elements that each need to be physically and/or communicatively coupled to one or more corresponding elements present on the other one of the first housing 102 or the second housing 104. Examples of the active elements include, but are not limited to, a camera, a display and a fingerprint sensor. For example, a camera present on the first housing 102 may need to be communicatively coupled to a microprocessor present on the second housing 104.

Figure 2:
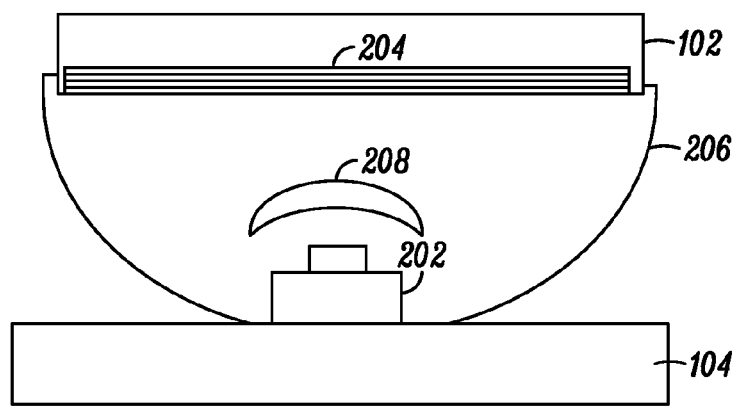
FIG. 2 illustrates a cross-sectional view of a slide chamber incorporated as part of one or more slide rails along the length of the same for use in connection with a travel path for a pair of housings in conjunction with a strip to point optical communication system of a device having a first housing and a second housing, in accordance with at least one embodiment of the present invention.

FIG. 2 illustrates a cross-sectional view of a slide chamber incorporated along one or more slide rails for use in connection with a travel path for a pair of housings in conjunction with a strip to point optical communication system 200 of a device having a first housing 102 and a second housing 104, in accordance with at least one embodiment of the present invention. Examples of the device can include the device 100, illustrated in FIG. 1. The strip to point optical communication system 200 includes a point optical communication element 202 and a strip optical communication element 204. As noted above, in accordance with at least some embodiments of the present invention, the first housing 102 and the second housing 104 can be incorporated as part of a device having a slider configuration. The point optical communication element 202 is capable of receiving light and can be coupled either to the first housing 102 or the second housing 104 of the device. An example of the point optical communication element 202 includes a photodiode. The strip optical communication element 204 is capable of emitting the light and can include one or more sources of light, such as light emitting elements. The strip optical communication element 204 can be adapted to direct and also diffuse the light from the one or more sources of light so as to distribute and emit the light along the length of the strip optical communication element 204. Examples of the one or more light emitting elements include a laser source and a light emitting diode. In at least one embodiment of the present invention, optical power output of the one or more sources of light is varied in accordance with a characteristic of an incoming signal, which can be used to encode a detectable data stream onto the light being produced by the strip optical communication element 204. For example, light output of a light emitting diode is controlled by a current applied to the light emitting diode. Examples of characteristics of the incoming signal that can be varied can include, but is not limited to, a frequency, a phase and amplitude. The strip optical communication element 204 can be coupled to the other one of the first housing 102 or the second housing 104 to which the point optical communication element 202 is not coupled. In at least one embodiment of the present invention, the length of the strip optical communication element 204 can correspond to a travel distance of either the first housing 102 or the second housing 104. Furthermore, the strip optical communication element 204 is located so as to coincide with a travel path of the point optical communication element 202, where the travel path includes a set of points corresponding to the position of the point optical communication element 202 as the first housing 102 and/or the second housing 104 move between a plurality of different usage positions. The various different usage positions generally relate to one or more positions where the point optical communication element 202 is aligned to receive the light emitted by the strip optical communication element 204. In at least some instances, the strip optical communication element 204 can include an optical medium for directing the light emitted by the one or more sources of light along the length of the strip optical communication element 204. Examples of an optical medium include a light guide, a light pipe, a fiber-optic cable, each of which can include a hollow and/or generally an optically transparent channel along which the light can travel and exit at least plurality of pre-designated points.

The strip to point optical communication system 200 can also include at least an optical light collector 206 or a reflector scheme, so as to further direct more of the emitted light from the strip optical communication element 204 to the point optical communication element 202. An example of forms or structures that the optical light collector 206 can incorporate includes, but is not limited to, a compound parabolic concentrator, a cone and a V-shaped guide. The compound parabolic concentrator can be made of a solid transparent material with polished surfaces. In at least one embodiment of the present invention, the compound parabolic concentrator can be a hollow cone and can be made of a material with polished or mirrored surfaces. Examples of the material include, but are not limited to, aluminum, gold, copper and silver. The compound parabolic concentrator can direct the light towards the point optical communication element 202 when the light is received within a compound parabolic concentrator designed angle. The compound parabolic concentrator designed angle is the angle within which the light is directed by the compound parabolic concentrator toward an area that the point optical communication element 202 is likely to be located. If the light falls outside the compound parabolic concentrator designed angle, the light is rejected by the compound parabolic concentrator.

The optical medium can also provide at least a portion of a sliding mechanism between the first housing 102 and the second housing 104. The optical light collector 206 can form the female part of the sliding mechanism while the optical medium can form the male part. In at least one embodiment of the present invention, the optical light collector 206 has its outer ends wrapped around the optical medium enabling the optical light collector 206 and the optical medium to stay mechanically engaged. The optical medium is therefore acting as a slide rail.

In the reflector scheme, a reflective surface is provided prior and subsequent to the point optical communication element 202. The light can be guided inside the optical medium by the reflective surface. The guided light inside the optical medium can be focused toward the position of the point optical communication element 202 by the optical light collector 206. In at least one embodiment of the present invention, one or more geometries can be provided to the reflective surface prior and subsequent to the point optical communication element 202 in the reflector scheme. Examples of the one or more geometries can include, but are not limited to, a ramp, an enclosed ramp, a multiple ramp, and a curved ramp. Furthermore, the one or more geometries can be provided to the reflective surface separately, along one or more dimensions, or axes. For example, the reflective surface can be formed as multiple ramps (i.e. saw-tooth) along the length of the surface, and can be formed with a curved geometry along the width of the surface. For a person ordinarily skilled in the art, it would be apparent that other combinations are further possible without departing from the scope of the present invention. The one or more geometries provided to the reflective surface can be used to help direct the light towards the point optical communication element 202. Further, a surface of the strip optical communication element 204 facing the point optical communication element 202 can be provided with at least one of a curved geometry and ramp geometry. In some instances, the various geometries will help direct the exit angle of the light as it is emitted from the strip optical communication element 204. In this way, the geometry on the surface of the strip optical communication element 204 can similarly be used to help concentrate and/or direct the light toward the point optical communication element 202. The ramp geometry can include one or more ramps, such as in a saw-tooth configuration.

The strip to point optical communication system 200 can also include a lens 208 for directing and/or concentrating the light emitted by the strip optical communication element 204 and received by the lens 208 proximate the point optical communication element 202 towards the point optical communication element 202. An example of the lens 208 can include, but is not limited to, a convex lens.

Figure 3:
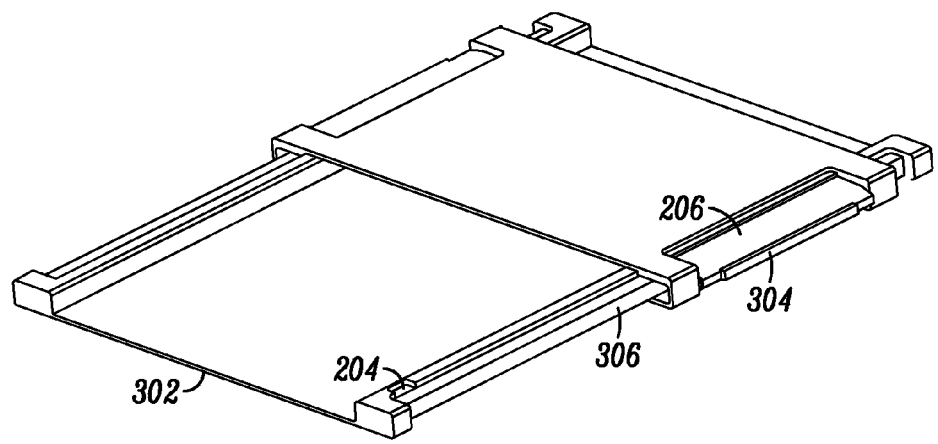
FIG. 3 illustrates a base movement mechanism incorporating a strip to point optical communication system, in accordance with at least one embodiment of the present invention, which facilitates the relative movement of two housing portions coupled thereto.

FIG. 3 illustrates a base movement mechanism 200 incorporating a strip to point optical communication system in device 100, in accordance with at least one embodiment of the present invention. The wireless communication device 100 includes a frame 302 for a two part housing including the first housing 102 and the second housing 104. The first housing 102 and the second housing 104 can move relative to one another along substantially parallel paths. In at least one embodiment of the present invention, the strip to point optical communication system of the base movement mechanism 200 includes the point optical communication element 202 and the reflective surface. The point optical communication element 202 and the reflective surface are illustrated as element 304 in FIG. 3. The strip to point optical communication system of base movement mechanism 200 further includes the strip optical communication element 204. The point optical communication element 202 receives the light emitted by the strip optical communication element 204. The point optical communication element 202 can be coupled to either the first housing 102 or the second housing 104. Further, the strip optical communication element 204 can be coupled to either the first housing 102 or the second housing 104 to which the point optical communication element 202 is not coupled. The length of the strip optical communication element 204 can correspond to the travel distance of the first housing 102 and the second housing 104. Further, the strip optical communication element 204 can be located to coincide with a travel path of the point optical communication element 202. In at least one embodiment of the present invention, the strip optical communication element 204 can be supplied with the light from one or more light emitting elements along its length.

The strip to point optical communication system of the base movement mechanism 200 can also include an optical medium 306 for directing the light along the length of the strip optical communication element 204. Examples of the optical medium 306 can include, but is not limited to, a bar, an optical-fiber, a housing material, an acrylic material, a filter material, and a hollow pipe. The optical medium 306 can be highly transparent and it can pass the light with low attenuation. In at least one embodiment of the present invention, the optical medium 306 can be designed to filter out light having an unwanted wavelength. For example, when a laser source that emits light in visible range is used, the optical medium 306 that is transparent to the visible range can pass the light without attenuation. Further, when an infrared diode source is used to produce the light which is to be emitted, an optical medium 306 can be used that is transparent to the infrared range of the light, and can filter out unwanted interference such as light in the visible range. In at least one embodiment of the present invention, the optical medium 306 can also provide a sliding mechanism between the first housing 102 and the second housing 104.

In at least one embodiment of the present invention, the strip to point optical communication system of the base movement mechanism 200 in the wireless communication device 100 can also include at least one of the optical light collector 206 or a reflector scheme.

Figure 4:
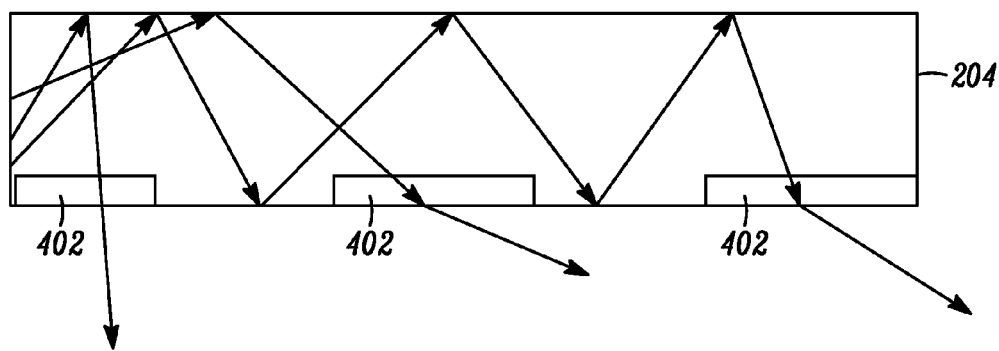
FIG. 4 illustrates a strip optical communication element of the strip to point optical communication system, in accordance with at least one embodiment of the present invention.

FIG. 4 illustrates the strip optical communication element 204 of the strip to point optical communication system 200, in accordance with at least one embodiment of the present invention. The strip optical communication element 204 can include one or more light emitting elements along its length. In at least one embodiment of the present invention, the optical medium 306 can be etched in one or more discrete spots 402, which in turn can enable the light to readily enter and/or exit at discrete points along the length of the optical medium 306 where etched, and thereby effectively provide illumination along the length of the strip optical communication element 204 at least each of the anticipated usage positions. The one or more discrete spots 402 enable optical communication between the point optical communication element 202 and the strip optical communication element 204, when the location of the point optical element 202 coincides with the light emitted from at least one of the one or more discrete spots 402. Examples of location of the one or more discrete spots 402 can include, but are not limited to, one end of the strip optical communication element 204, the other end of the strip optical communication element 204 and locations corresponding to the middle of the strip optical communication element 204. However, the discrete spots 402, should be positioned to coincide with and/or support one or more usage positions of the device between different positions along the travel length of the multiple housings when the multiple housings of the device move relative to one another.

In at least one embodiment of the present invention, larger or more frequent etching can be provided to the strip optical communication element 204 at locations that are farther away from a first light emitting element, such as when the first light emitting element is used at one end of the strip optical communication element 204 so as to enable a more uniform emission of the light along the length of the strip optical communication element 204. As the light travels along the length of the strip optical communication element 204, the light is emitted from the one or more discrete spots 402. As one moves farther from the source of the light (i.e. the first light emitting element), the light available to exit the strip optical communication element 204 is diminished. Consequently, more frequent etching is required as one move farther away from the source of the light to provide a more uniform emission across the entire length of the strip optical communication element 204. In a further embodiment of the present invention, a second light emitting element can be used at the other end of the strip optical communication element 204. In such an instance, the drop off in the available light from the first light emitting element along the length of the strip optical communication element 204 for emission would have an inverse relationship relative to the available light supplied by the second light emitting element supplying light to the strip optical communication element 204 at the opposite end. Thus, the optical medium 306 is more uniformly illuminated by the use of the first light emitting element and the second light emitting element without necessarily providing larger or more frequent etchings.

Figure 5:
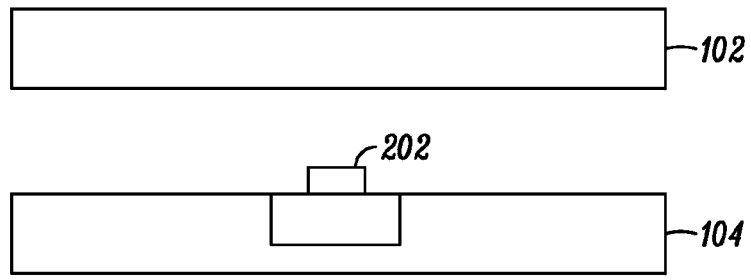
FIG. 5 illustrates a cross-sectional view of the slide chamber of the device having the first housing and the second housing, in accordance with at least one embodiment of the present invention.

FIG. 5 illustrates a cross-sectional view of the slide chamber of the device having the first housing 102 and the second housing 104, in accordance with at least one embodiment of the present invention. As illustrated in FIG. 5, the point optical communication element 202 is coupled to the second housing 104 in a flush position. In the flush position, the point optical communication element 202 is largely recessed so that the strip optical communication element 204 more closely corresponds to adjacent surfaces of the point optical communication element 202 along a travel path. In a further embodiment of the present invention, the point optical communication element 202 can be coupled to one of the first housing 102 and the second housing 104 in an offset position. In the offset position, the point optical communication element 202 is largely positioned above or on top of the corresponding adjacent surfaces. The offset position of the point optical communication element 202 is illustrated in FIG. 2.

Figure 6:
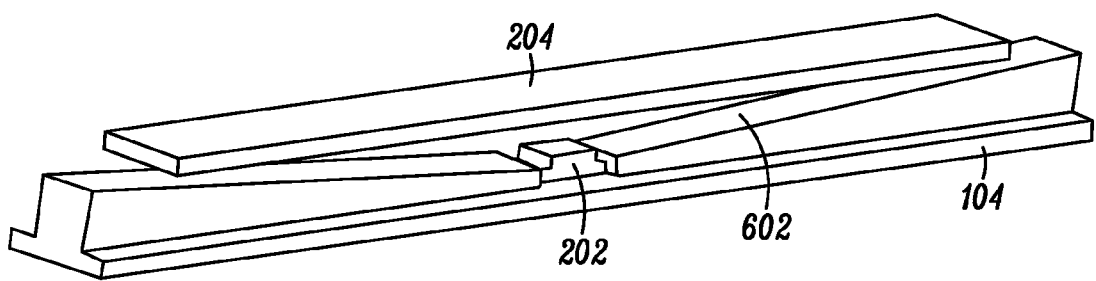
FIG. 6 illustrates geometry of a reflective surface of the slide chamber of the device having the first housing and the second housing, in accordance with at least one embodiment of the present invention.

FIG. 6 illustrates geometry of a reflective surface of the slide chamber of the device having the first housing 102 and the second housing 104, in accordance with at least one embodiment of the present invention. As illustrated in the FIG. 6, the point optical communication element 202 is coupled to the first housing 102. The strip optical communication element 204 is coupled to the second housing 104. The first housing 102 and the second housing 104 can move along a pair of substantially parallel paths. The strip optical communication element 204 can include one or more light emitting elements, emitting the light into the strip optical communication element 204 that would diffuse the light along the length of the strip optical communication element 204. In at least one embodiment of the present invention, the reflective surface prior and subsequent to the point optical communication element 202 is provided with a ramp 602.

The ramp 602 is an inclined surface on the first housing 102 to which the point optical communication element 202 is coupled. The ramp 602 therefore is moving relative to the second housing 104 to which the ramp 602 is not coupled. The ramp 602 helps to direct the light toward the point optical communication element 202. In a further embodiment of the present invention, the strip optical communication element 204 and the ramp 602 are modified to enclose a chamber. Together, the ramp 602 and the chamber can be used to help direct the light towards the point optical communication element 202.

Figure 7:
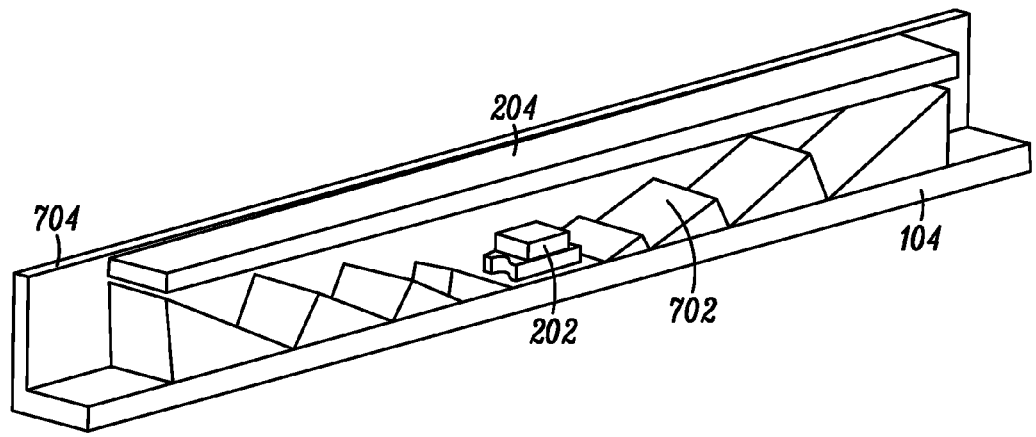
FIG. 7 illustrates the geometry of the reflective surface of the slide chamber of the device having the first housing and the second housing, in accordance with another embodiment of the present invention.

FIG. 7 illustrates the geometry of the reflective surface of the slide chamber, of the device having the first housing 102 and the second housing 104, in accordance with another embodiment of the present invention. As illustrated in FIG. 7, the reflective surface is provided with a multiple ramped surface 702 prior and subsequent to the point optical communication element 202. The multiple ramped surface 702 similarly help to direct the light to the point optical communication element 202. As illustrated in FIG. 7, the strip optical communication element 204 can have a top interface with a wall 704, which further encapsulates the slide chamber to further minimize leakage of the light, and in turn allow more of the light to reach the point optical communication element 202.

Figure 8:
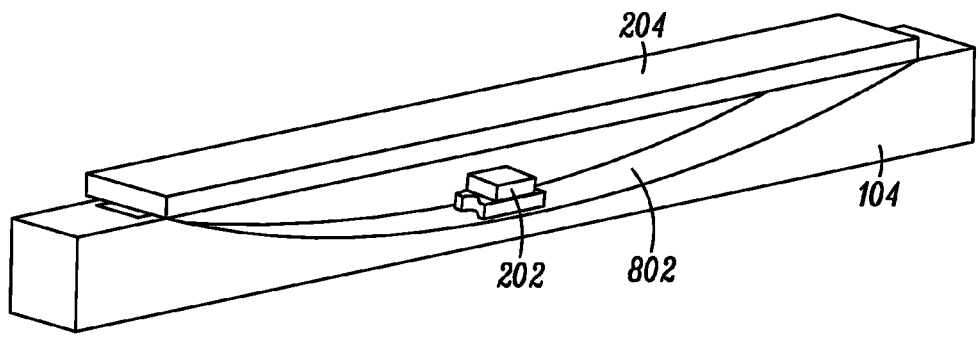
FIG. 8 illustrates the geometry of the reflective surface of the slide chamber of the device having the first housing and the second housing, in accordance with yet another embodiment of the present invention.

FIG. 8 illustrates the geometry of the reflective surface of the slide chamber of the device having the first housing 102 and the second housing 104, in accordance with yet another embodiment of the present invention. As illustrated the reflective surface, prior and subsequent to the point optical communication element 202 is provided with a curved ramp 802. In at least one embodiment of the present invention, the curved ramp 802 has a parabolic shape with the point optical communication element 202 placed at the origin of the parabolic surface.

Figure 9:
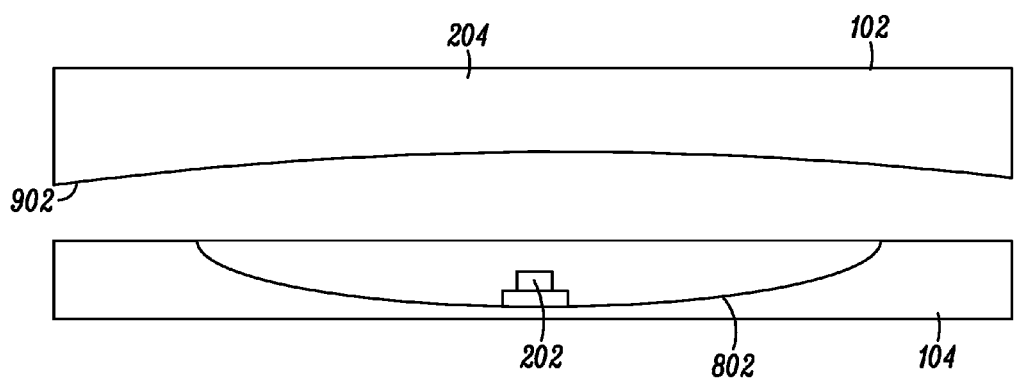
FIG. 9 illustrates the geometry of a strip optical communication element, in accordance with yet another embodiment of the present invention.

FIG. 9 illustrates the geometry of the strip optical communication element 204, in accordance with yet another embodiment of the present invention. As illustrated the reflective surface is provided with the curved ramp 802 prior and subsequent to the point optical communication element 202. In the illustrated embodiment, the surface of the strip optical communication element 204 facing the point optical communication element 202 is similarly provided with a curved geometry 902. The curved geometry 902 can be a parabolic surface, which helps to direct the light leaving the strip optical communication element 204. When the curved geometry 902 is parabolic, the point optical communication element 202 can be placed toward and/or at the focal point of the parabola. Alternatively, the surface of the strip optical communication element 204 can be provided with ramp geometry, where the ramp geometry can include one or more ramps, such as in a saw-tooth configuration.

Various embodiments of the present invention, as described above, enable optical communication of data. The strip to point optical communication system enables higher speed optical communication of the data supporting communication at least of the order of multiples of gigabytes per second. The strip to point optical communication system provided in the present invention does not involve the use of a multi-layer flex circuit, thereby increasing reliability of the device, and avoiding a source of radio-frequency interference. The present invention significantly reduces the cost of data communication as the multi-layer flex circuit is not used and involves the usage of cheap components that are easy to assemble.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A strip to point optical communication system for transmitting light between a first housing and a second housing of a device, the first housing and the second housing moving relative to one another a distance corresponding to a travel distance between a plurality of different usage positions, the strip to point optical communication system comprising:

a point optical communication element capable of receiving the light, the point optical communication element being coupled to one of the first housing and the second housing; and a strip optical communication element capable of emitting the light, the strip optical communication element being coupled to the other one of the first housing and the second housing to which the point optical communication element is not coupled, wherein a length of the strip optical communication element corresponds to the travel distance of the first housing and the second housing, and the strip optical communication element is located to coincide with a travel path of the point optical communication element.

2. A strip to point optical communication system of claim 1, wherein the first housing and the second housing travel along respective ones of a pair of substantially parallel paths.

3. A strip to point optical communication system of claim 1, wherein the first housing and the second housing are incorporated as part of a communication device having a slider configuration.

4. A strip to point optical communication system of claim 1, wherein the point optical communication element is a photodiode.

5. A strip to point optical communication system of claim 1, wherein the strip optical communication element comprises one of more light emitting elements selected from the group comprising a laser source and a light emitting diode.

6. A strip to point optical communication system of claim 5 further comprising an optical medium for directing the light emitted from the one of more light emitting elements so as to produce the light along the length of the strip optical communication element.

7. A strip to point optical communication system of claim 6, wherein the optical medium is selected from the group comprising a bar, an optical-fiber, a housing material, an acrylic material, a filter material and a hollow pipe.

8. A strip to point optical communication system of claim 6, wherein the optical medium is etched in one or more discrete spots, wherein the one or more discrete spots allow optical communication between the strip optical communication element and the point optical communication element.

9. A strip to point optical communication system of claim 1 further comprising a lens for directing the light to the point optical communication element.

10. A strip to point optical communication system of claim 1 further comprising at least one of an optical light collector and a reflector scheme.

11. A strip to point optical communication system of claim 10, wherein the optical light collector is selected from the group comprising a compound parabolic concentrator, a cone and a V-shaped guide.

12. A strip to point optical communication system of claim 10, wherein the reflector scheme comprises a reflective surface prior and subsequent to the point optical communication element.

13. A strip to point optical communication system of claim 12, wherein the reflector scheme comprises one or more geometries selected from the group comprising a ramp, an enclosed ramp, a multiple ramp, and a curved ramp.

14. A strip to point optical communication system of claim 13, wherein the one or more geometries of the reflector scheme are provided along each of one or more axes.

15. A strip to point optical communication system of claim 1, wherein surface of the strip optical communication element, which faces the point optical communication element, is provided with at least one of a curved geometry and a ramp geometry.

16. A device comprising:
a two part housing comprising a first housing and a second housing adapted to move relative to one another; and
one or more strip to point optical communication systems for transmitting light between the first housing and the second housing, each strip to point optical communication system comprising:
   a point optical communication element capable of receiving the light, the point optical communication element being coupled to one of the first housing and the second housing; and
   a strip optical communication element capable of emitting the light, the strip optical communication element being coupled to the other one of the first housing and the second housing to which the point optical communication element is not coupled, wherein a length of the strip optical communication element corresponds to a travel distance of the first housing and the second housing, and the strip optical communication element is located to coincide with a travel path of the point optical communication element.

17. A device of claim 16, wherein the one or more strip to point optical communication systems includes a first strip to point optical communication system and a second strip to point optical communication system;
   wherein the point optical communication element of the first strip to point optical communication system is coupled to the first housing, and the strip optical communication element of first strip to point optical communication system is coupled to the second housing; and
   wherein the point optical communication element of the second strip to point optical communication system is coupled to the second housing, and the strip optical communication element of second strip to point optical communication system is coupled to the first housing.

18. A device in accordance with claim 16, wherein the strip to point optical communication system further comprises at least one of an optical light collector and a reflector scheme.

19. A device in accordance with claim 18, wherein the optical light collector is selected from the group comprising a compound parabolic concentrator, a cone and a V-shaped guide; and wherein the reflector scheme comprises a reflective surface prior and subsequent to the point optical communication element.

20. A device in accordance with claim 16, wherein the device is a wireless communication device.

* * * * *